Dec. 22, 1964  C. F. BENSON  3,162,025
CONSTANT VELOCITY UNIVERSAL COUPLING
Filed Oct. 24, 1962  4 Sheets-Sheet 1
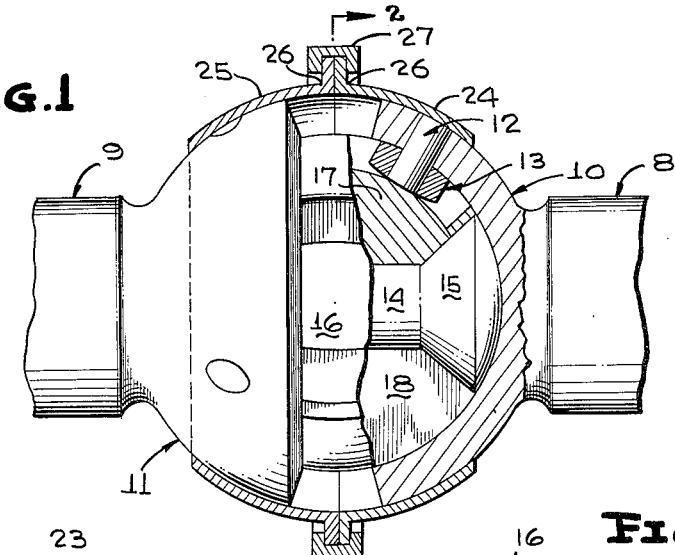
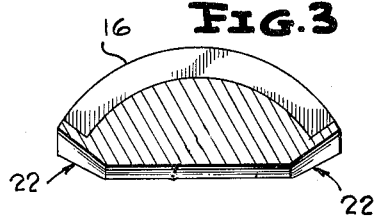
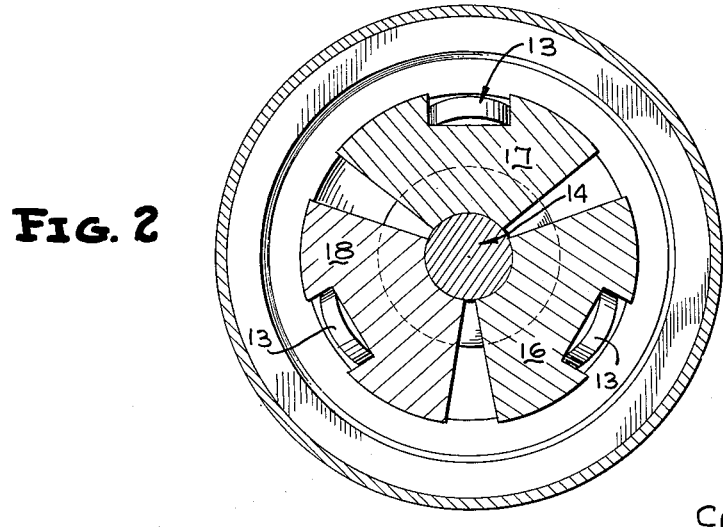
CARL F. BENSON
INVENTOR.
ATTORNEYS Dec. 22, 1964     C. F. BENSON     3,162,025
CONSTANT VELOCITY UNIVERSAL COUPLING
Filed Oct. 24, 1962     4 Sheets-Sheet 3
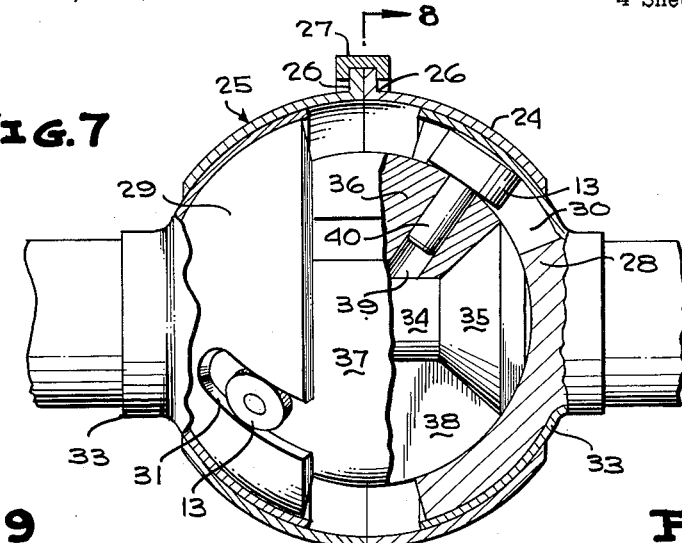
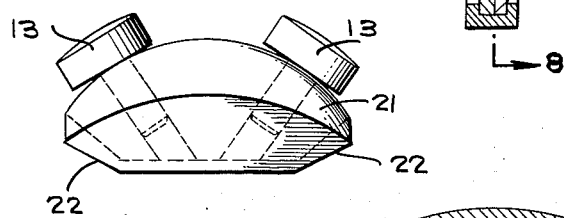
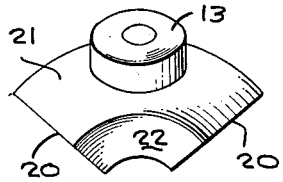
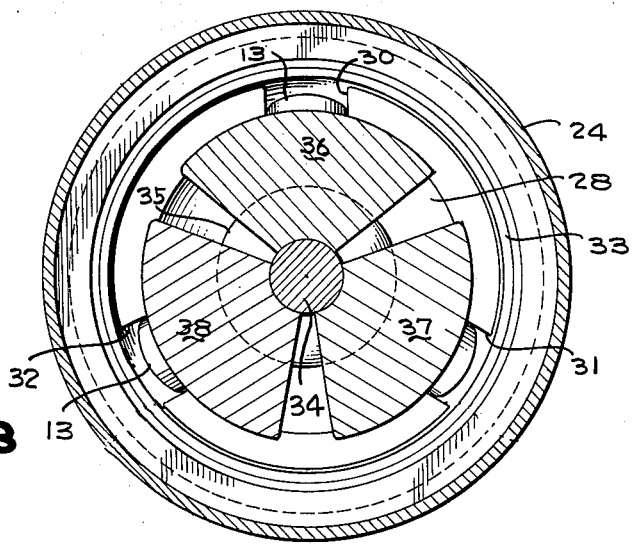
CARL F. BENSON
INVENTOR.
BY
ATTORNEYS Dec. 22, 1964 C. F. BENSON 3,162,025
CONSTANT VELOCITY UNIVERSAL COUPLING
Filed Oct. 24, 1962 4 Sheets-Sheet 4

CARL F. BENSON
INVENTOR.

BY
ATTORNEYS

United States Patent Office 3,162,025
Patented Dec. 22, 1964

3,162,025
CONSTANT VELOCITY UNIVERSAL COUPLING
Carl F. Benson, Torrington, Conn., assignor to The Torrington Company, Torrington, Conn., a corporation of Maine
Filed Oct. 24, 1962, Ser. No. 232,755
1 Claim. (Cl. 64—21)

The specification which follows relates to an improved constant velocity universal coupling particularly adapted for the transmission unit on the drive for a propeller shaft of an automobile engine and the like.

The propeller shaft of an internal combustion engine and the transmission or differential gearing are not in accurate alignment or on coincidental axes. It is therefore necessary to use a universal coupling for the transfer of power from one element to the other. It is also important under such circumstances that a constant radial velocity be maintained through the coupling.

It is an object of this invention to provide a coupling of this type that has a minimum number of parts, each of simple form and which can be readily assembled or dismantled by unskilled labor.

It is a further object of the invention to design a coupling in which the parts are interchangeable.

Another object of the invention is to provide such a coupling so that it will require a minimum of lubrication or care and will be relatively dust proof.

A still further object of the invention is to materially reduce the friction losses resulting from the sliding movement between the several operating units.

The above and other advantages will be apparent from the following description of the preferred forms of the invention illustrated by way of example on the accompanying drawings in which:

FIGURE 1 is a side elevation of the improved coupling partly in vertical section;

FIGURE 2 is a transverse vertical section on the line 2—2 of FIGURE 1;

FIGURE 3 is a longitudinal vertical section of one of the segments;

FIGURE 4 is an end view of the same;

FIGURE 7 is a side elevation of a modified form of the improved coupling partly in vertical section;

FIGURE 8 is a transverse vertical section on the line 8—8 of FIGURE 7;

FIGURE 9 is a side view of one of the segments;

FIGURE 10 is an end view of the same;

Figure 5:
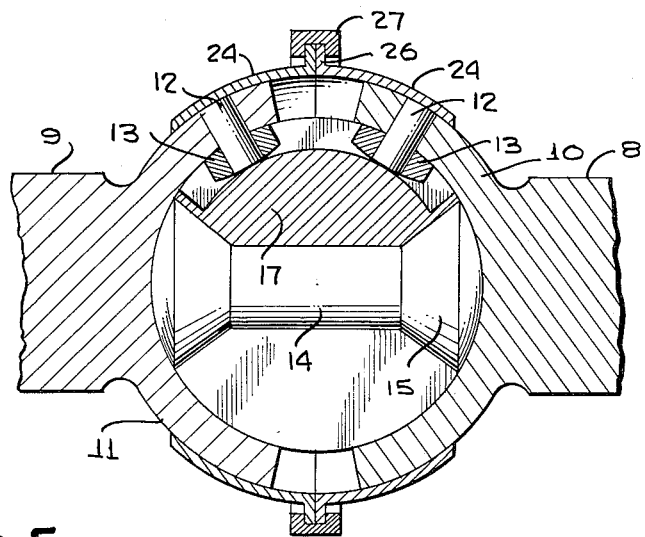
FIGURE 5 is a longitudinal vertical section of the coupling, taken on the line 5—5 of FIGURE 6.
Figure 6:
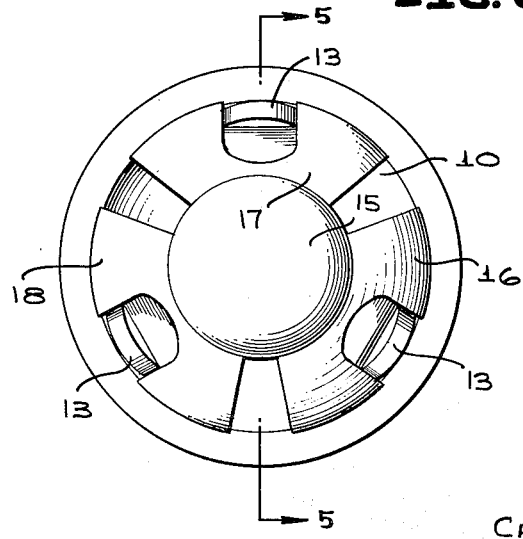
FIGURE 6 is an end elevation of coupling with the nearer shaft and dust covers removed.

Briefly described, it is the purpose of this invention to connect a drive shaft with a driven shaft where the two are not in alignment by means of connecting units which maintain constant angular velocity for the two shafts.

In the forms illustrated, the drive shaft 8 is arranged opposite the driven shaft 9 in such a way that the axes of the two shafts may be inclined as much as 30°.

This is accomplished by providing two terminal cups. The terminal cup 10 forms part of the drive shaft 8 or is attached thereto. In like manner, the opposite terminal cup 11 is part of the driven shaft 9. These cups are part-spherical. However, they do not meet as shown in FIGURE 1 except at the most extreme inclination of the shafts and then only at one point. The cups 10 and 11 are hollow as shown on FIGURE 1. Each cup carries a plurality of equally spaced gudgeons 12. In the form shown, these are three in number and spaced 120° apart. The gudgeons project inwardly of the cups and form stub shafts for antifriction rollers 13, 13. These may be plain rollers or be needle bearings, as occasion may demand.

The coupling includes a center spindle 14, located generally in the intersection between the axes of the shafts 8 and 9. This spindle is generally spool shaped, cylindrical and has a smooth outer bearing surface. The spindle extends from the interior of one cup to the interior of the other one.

Conical bearing surfaces are provided at each end of the spindle 14 in the form of heads 15.

The spindle 14 forms a shaft bearing for a plurality of segments 16, 17 and 18. Each segment has a hollow cylindrical base conforming to the curvature of the spindle 14 on which it is carried.

The side walls 20, 20 of the segment extend radially from the center of the spindle 14 and are spaced apart approximately 90°.

The outer surface 21 of each segment is spherical and conforms to the inner wall of the cups 10 and 11.

The ends of the segments are truncated as shown at 22. Thus the truncated ends bear upon the conical side surface of the heads 15.

Along a median, longitudinal line each segment 16, 17 and 18 is slotted to form a key way 23. This key way has a constant rectangular cross section. It forms a key way for the reception of one roller 13 from each of the cups 10 and 11.

It will be evident that the drive shafts may be inclined for as much as 30°. Accordingly the segments 16, 17 and 18 will be shifted angularly until the adjacent sides contact. In this operation the rollers 13 on the cup 10 will transmit rotary power to the corresponding rollers on the cup 11.

A pair of part-spherical cover plates 24, 25 are fitted over the meeting ends of the cups 10 and 11, as shown in FIGURE 1.

Each of the cover plates has a flange 26, and these are face to face. A clamping ring 27 fits closely over the adjoining flanges and is fastened to hold the cover plates together. These cover plates may slide loosely over the cups 10 and 11, but are of such combined width that the gap between the edges of the cups is never exposed. This space will serve to hold a lubricant to supply lubrication to the relatively movable parts. It also serves to insure the coupling against the introduction of dust and the like.

A modified form of the invention is shown in FIGURES 7 to 12 inclusive. It differs mainly in the fact that the cups of the shafts are slotted yokes in which the rollers 13 move. These rollers are journalled on the segments.

Thus the axis of the drive shaft 8 is shown slightly inclined to that of the driven shaft 9. Cups 28, 29 integral with the shafts form yokes. These yokes provide slots 30, 31 and 32 equally spaced 120° apart.

Each cup or yoke 28, 29 is surrounded by a housing 33, fitted frictionally over the yokes and the adjacent parts of the shafts.

The intermediate element of the coupling includes a cylindrical spindle 34. This spindle is provided with conical heads 35, 35. The heads are in slidable contact with the inner walls of the cups 28, 29.

Three segments 36, 37 and 38 are journalled on the spindle 34 and ends 35, 35.

Each segment as in the form already described, has a part-cylindrical bottom surface journalled on the midportion of the spindle 34. Each segment is also provided with opposite radial sides 20, 20. The sides are separated by an angle of approximately 90°, so that there is accordingly approximately 30° of vacant space between the segments in normal position.

Spherical outer surfaces 21 are formed on the segments and are in slidable contact with the spherical inner wall of each cup.

The ends 22 of the segments are truncated and concave. They are journalled upon the conical surfaces of the ends 35, 35 of the spindle 34.

Figure 11:
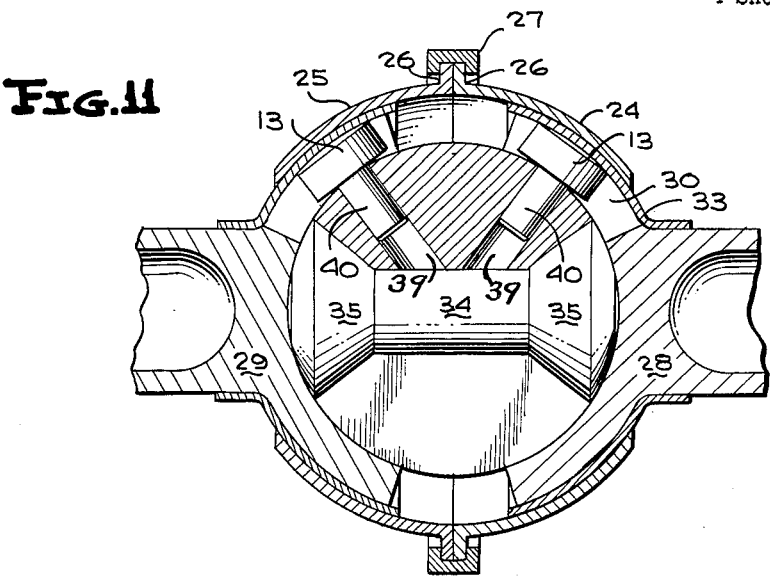
FIGURE 11 is a longitudinal vertical section of the modified form of the coupling taken on the line 11—11 of FIGURE 12.
Figure 12:
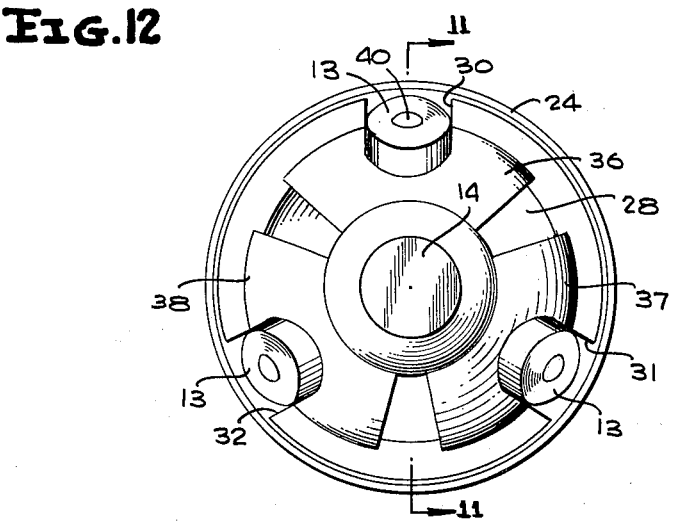
FIGURE 12 is an end elevation of the modified form of the coupling with the nearer shaft and dust covers removed.

Each segment has two radial bores 39, 39, as shown in FIGURES 7 and 11. Gudgeons 40, 40 are pressed into holes 39, 39. A roller 13 is carried on each gudgeon 40. The antifriction roller 13 fits within the slot 30 of the adjacent cup. Thus the rotary force applied from the drive shaft 8 to one roller 13 is delivered through the opposite roller 13 to the yoke of the driven shaft 9.

The constant angular velocity of the drive shaft 8 is delivered in this manner to the driven shaft 9. In operation the segments 36, 37 and 38 shift relatively to each other during rotation in an amount determined by the inclination of the shafts and rotate in a plane bisecting the angle between the two shafts.

Two cover plates 24, 25 fit over housings 33 on the cups 28 and 29 respectively. The cover plates have abutting flanges 26 which are held together by a clamping ring 27.

In either modification of the invention, the structure is composed of duplicate interchangeable cups, segments, shafts and rollers. There is thus an economy in manufacture of the coupling. The coupling is easily assembled without skilled attention. The coupling is by its structure unusually strong. The relatively moving parts are not subject to excessive wear and can be readily kept in lubricated condition with a minimum of attention.

The preferred form of the invention has been illustrated by way of example and without limitation as to materials, proportions and variation in minor details within the scope of the appended claim.

What I claim as my invention is:

A constant velocity universal coupling comprising a drive shaft, a driven shaft, a part-spherical cup on each shaft, an intermediate spindle having flaring ends slidable on the spherical inner surface of each cup, a plurality of part-spherical segments having longitudinal slots supported on the spindle and slidable on the spherical inner surface of each cup, and means on both cups for slidably engaging the slot in each segment.

References Cited by the Examiner
UNITED STATES PATENTS

| | | | |
|---|---|---|---|
| 2,057,736 | 10/36 | Parville | 64—21 |
| 2,627,734 | 2/53 | Villard | 64—21 |
| 3,083,549 | 4/63 | Benson | 64—21 |

ROBERT C. RIORDON, *Primary Examiner.*